(12) United States Patent
Lee et al.

(10) Patent No.: US 12,210,214 B2
(45) Date of Patent: Jan. 28, 2025

(54) OPTICAL IMAGING SYSTEM

(71) Applicant: Samsung Electro-Mechanics Co., Ltd., Suwon-si (KR)

(72) Inventors: Tae Youn Lee, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/371,763

(22) Filed: Sep. 22, 2023

(65) Prior Publication Data

US 2024/0012224 A1 Jan. 11, 2024

Related U.S. Application Data

(60) Continuation of application No. 17/307,186, filed on May 4, 2021, now Pat. No. 11,796,762, which is a
(Continued)

(30) Foreign Application Priority Data

Sep. 12, 2016 (KR) .................. 10-2016-0117275
Oct. 20, 2016 (KR) .................. 10-2016-0136720

(51) Int. Cl.
*G02B 9/62* (2006.01)
*G02B 13/00* (2006.01)
*G02B 13/02* (2006.01)

(52) U.S. Cl.
CPC ........... *G02B 9/62* (2013.01); *G02B 13/0045* (2013.01); *G02B 13/02* (2013.01)

(58) Field of Classification Search
None
See application file for complete search history.

(56) References Cited

U.S. PATENT DOCUMENTS 3,942,875 A 3/1976 Betensky
4,206,976 A 6/1980 Kitagishi
(Continued)

FOREIGN PATENT DOCUMENTS

CN 202886714 U 4/2013
CN 103913821 A 7/2014
(Continued)

OTHER PUBLICATIONS

Korean Office Action issued on Sep. 25, 2017, in counterpart Korean Patent Application No. 10-2016-0136720 (8 pages in English, 5 pages in Korean).
(Continued)

*Primary Examiner* — Darryl J Collins
(74) *Attorney, Agent, or Firm* — NSIP Law (57) ABSTRACT

An optical imaging system includes first, second, third, fourth, fifth, and sixth lenses each having a refractive power. The first to sixth lenses are sequentially disposed in ascending numerical order along an optical axis of the optical imaging system from an object side of the optical imaging system toward an imaging plane of the optical imaging system, and are the only lenses having a refractive power in the optical imaging system. A radius of curvature of an object-side surface of the fourth lens at the optical axis is greater than a radius of curvature of an object-side surface of the second lens at the optical axis and a radius of curvature of an image-side surface of the second lens at the optical axis. A thickness of the third lens is greater than a distance from an image-side surface of the third lens to the object-side surface of the fourth lens.

14 Claims, 10 Drawing Sheets

Related U.S. Application Data continuation of application No. 16/377,343, filed on Apr. 8, 2019, now Pat. No. 11,029,490, which is a division of application No. 15/468,312, filed on Mar. 24, 2017, now Pat. No. 10,302,911.

(56) References Cited

U.S. PATENT DOCUMENTS

| | | | |
|---|---|---|---|
| 10,302,911 | B2 | 5/2019 | Lee et al. |
| 11,029,490 | B2 | 6/2021 | Lee et al. |
| 2012/0314301 | A1 | 12/2012 | Huang et al. |
| 2013/0314804 | A1 | 11/2013 | Kubota et al. |
| 2014/0092491 | A1* | 4/2014 | Hsu .................. G02B 13/0045 359/761 |
| 2014/0111876 | A1 | 4/2014 | Tang et al. |
| 2015/0109692 | A1 | 4/2015 | Son |
| 2015/0177483 | A1 | 6/2015 | You |
| 2015/0260960 | A1 | 9/2015 | Tang et al. |
| 2016/0004039 | A1 | 1/2016 | Chen |
| 2016/0004047 | A1 | 1/2016 | Iwasaki et al. |
| 2016/0124192 | A1 | 5/2016 | Koreeda |
| 2016/0187620 | A1 | 6/2016 | Huang |
| 2016/0187622 | A1 | 6/2016 | Huang |
| 2016/0216479 | A1 | 7/2016 | Chen et al. |
| 2016/0320589 | A1 | 11/2016 | Liao et al. |
| 2017/0146776 | A1 | 5/2017 | Kang et al. |
| 2017/0248770 | A1 | 8/2017 | Chen et al. |
| 2017/0269331 | A1 | 9/2017 | Jhang et al. |
| 2017/0315334 | A1 | 11/2017 | Liao et al. |
| 2018/0056869 | A1 | 3/2018 | Nagano |
| 2018/0059372 | A1 | 3/2018 | Cheng et al. |
| 2020/0049957 | A1* | 2/2020 | Tsai .................. G02B 13/0045 |
| 2021/0109327 | A1* | 4/2021 | Huang ............... G02B 13/0045 |

FOREIGN PATENT DOCUMENTS

| | | |
|---|---|---|
| CN | 104570294 A | 4/2015 |
| CN | 205281004 U | 6/2016 |
| CN | 105807408 A | 7/2016 |
| CN | 106526790 A | 3/2017 |
| CN | 107132638 A | 9/2017 |
| JP | 44-32713 B | 12/1969 |
| JP | 2015-43104 A | 3/2015 |
| JP | 2016-90777 A | 5/2016 |
| JP | 2018-31872 A | 3/2018 |
| KR | 10-2015-0072154 A | 6/2015 |
| KR | 10-2017-0059244 A | 5/2017 |

OTHER PUBLICATIONS

Korean Notice of Allowance issued on May 28, 2018, in counterpart Korean Patent Application No. 10-2016-0136720 (2 pages in English, 2 pages in Korean).

Chinese Office Action issued on Sep. 3, 2019, in counterpart Chinese Patent Application No. 201710368603.0 (12 pages in English, 9 pages in Chinese).

Chinese Office Action issued on Mar. 19, 2020, in counterpart Chinese Patent Application No. 201710368603.0 (11 pages in English, 8 pages in Chinese).

Chinese Office Action issued on Jan. 18, 2022, in counterpart Chinese Patent Application No. 202110251145.9 (12 pages in English, 9 pages in Chinese).

Korean Office Action issued on Jan. 10, 2023, in counterpart Korean Patent Application No. 10-2022-0065272 (7 pages in English, 5 pages in Korean).

U.S. Appl. No. 17/307,186, filed May 4, 2021, Tae Youn Lee et al., Samsung Electro-Mechanics Co., Ltd.

Korean Office Action issued on Jan. 25, 2024, in counterpart Korean Patent Application No. 10-2021-0101946 (4 pages in English, 4 pages in Korean).

* cited by examiner

| NUMBER OF SURFACE | K | A | B | C | D | E | F | G | H | J |
|---|---|---|---|---|---|---|---|---|---|---|
| S1 | -0.34208 | 1.10052E-02 | -5.90755E-03 | 3.38729E-02 | -6.19259E-02 | 6.11678E-02 | -3.38829E-02 | 8.96396E-03 | -1.08110E-03 | |
| S2 | 0.00000 | 5.39735E-02 | 5.64176E-02 | -5.28368E-01 | 1.24230E+00 | -1.63330E+00 | 1.25791E+00 | -5.28216E-01 | 9.32768E-02 | |
| S3 | 0.00000 | 6.13317E-02 | 2.23561E-01 | -2.01966E+00 | 7.05195E+00 | -1.49272E+01 | 2.01509E+01 | -1.67268E+01 | 7.77158E+00 | -1.54417E+00 |
| S4 | 2.62806 | 2.46078E-02 | 4.64070E-01 | -4.09678E+00 | 1.97655E+01 | -6.09447E+01 | 1.20474E+02 | -1.47023E+02 | 1.01129E+02 | -3.00775E+01 |
| S5 | 0.00000 | 8.38081E-02 | -4.97270E-02 | 2.37876E+00 | -2.53003E+01 | 1.13321E+02 | -2.85909E+02 | 4.19056E+02 | -3.33240E+02 | 1.11272E+02 |
| S6 | 0.00000 | -2.08709E-01 | 1.49609E+00 | -4.98207E+00 | 2.93755E+00 | 2.98220E+01 | -1.03500E+02 | 1.54098E+02 | -1.12056E+02 | 3.24489E+01 |
| S8 | 0.00000 | -3.07446E-01 | 1.20665E+00 | -1.23165E+00 | -1.10451E+00 | 6.46024E-01 | 1.57507E+02 | 2.02841E+02 | -1.35141E+02 | 3.67604E+01 |
| S9 | 0.00000 | -1.54460E-02 | 3.72603E-01 | -1.39182E+00 | 8.86773E-01 | -3.72768E-01 | 1.00708E+02 | -1.61621E+01 | 1.39131E+01 | -4.94855E+01 |
| S10 | 0.00000 | 4.12613E-02 | -2.94307E-01 | 4.71615E-01 | -3.91259E-01 | 1.36468E-01 | 3.86364E-02 | -5.88240E-02 | 2.28082E-02 | -3.16074E-03 |
| S11 | 0.00000 | -1.14184E-02 | -1.18614E-01 | 1.64411E-01 | -1.79456E-01 | 1.51935E-01 | -8.90894E-02 | 3.79432E-02 | -6.89217E-03 | 6.19744E-04 |
| S12 | 80.60842 | -1.57785E-01 | 2.49619E-01 | -3.23564E-01 | 2.55465E-01 | -1.30294E-01 | 4.50241E-02 | -1.03594E-02 | 1.42576E-03 | -8.75428E-05 |
| S13 | 0.00000 | -1.50993E-01 | 1.55712E-01 | -1.37931E-01 | 8.85705E-02 | -4.15023E-02 | 1.34663E-02 | -2.76353E-03 | 3.14128E-04 | -1.49427E-05 |

| NUMBER OF SURFACE | K | A | B | C | D | E | F | G | H | J |
|---|---|---|---|---|---|---|---|---|---|---|
| S1 | -0.34014 | 1.04169E-02 | 3.56800E-03 | -1.25392E-02 | 4.80309E-02 | -8.66573E-02 | 8.11016E-02 | -3.91848E-02 | 7.32530E-03 | |
| S2 | 0.00000 | 6.55229E-02 | -7.32436E-02 | -2.35030E-02 | 1.85933E-01 | -3.19236E-01 | 2.80158E-01 | -1.25826E-01 | 2.31109E-02 | |
| S3 | 0.00000 | 8.24965E-02 | -1.99561E-01 | 7.72523E-01 | -2.83164E+00 | 6.97720E+00 | -1.08497E+01 | 1.07737E+01 | -5.35702E+00 | 1.17611E+00 |
| S4 | 2.25052 | 2.96257E-02 | -2.89213E-03 | 1.61244E-01 | -7.05854E-01 | 1.57239E+00 | -1.52915E+00 | 1.35865E+00 | -4.41332E+00 | -2.73292E+00 |
| S5 | 0.00000 | 3.49505E-02 | -6.80361E-02 | 3.01306E-01 | -7.49844E-01 | 1.04053E+00 | -2.58221E-01 | 3.81784E-02 | -3.07649E-02 | 1.04267E-02 |
| S6 | 0.00000 | -1.60486E-01 | 9.65482E-02 | -3.71867E-01 | 1.10512E+00 | -2.40529E+00 | 3.07011E-01 | -1.87189E-01 | 2.47638E-01 | 1.44530E+00 |
| S8 | 0.00000 | -2.17128E-01 | 7.09064E-01 | -1.73474E+00 | 4.23336E+00 | -6.09906E+00 | 1.21932E+00 | 8.36048E+00 | -9.78780E+00 | 3.36986E+00 |
| S9 | 0.00000 | -3.13047E-04 | 2.51008E-01 | -8.69022E-01 | 4.12821E+00 | -1.21867E+00 | 2.43265E-01 | -3.19542E-01 | 2.46096E+01 | -8.29450E+01 |
| S10 | 0.00000 | 3.52333E-02 | -2.39043E-01 | 2.53158E-01 | 2.34647E-02 | -3.21153E-01 | 3.42640E-01 | -1.78034E-01 | 4.80007E-02 | -5.35185E-03 |
| S11 | 0.00000 | 4.85727E-03 | -1.41555E-01 | 1.89222E-01 | -1.96185E-01 | 1.53565E-01 | -8.29186E-02 | 2.83926E-02 | -5.52484E-03 | 4.63328E-04 |
| S12 | 80.60842 | -1.41756E-01 | 2.19020E-01 | -2.77092E-01 | 2.12362E-01 | -1.04184E-01 | 3.45905E-02 | -7.65177E-03 | 1.01155E-03 | -5.94453E-05 |
| S13 | 0.00000 | -1.53912E-01 | 1.68361E-01 | -1.63610E-01 | 1.14037E-01 | -5.52122E-02 | 1.76907E-02 | -3.48777E-03 | 3.77424E-04 | -1.69860E-05 |

| NUMBER OF SURFACE | K | A | B | C | D | E | F | G | H | J |
|---|---|---|---|---|---|---|---|---|---|---|
| S1 | -0.35040 | 9.89878E-03 | 1.33155E-02 | -5.33991E-02 | 1.50440E-01 | -2.35090E-01 | 2.06228E-01 | -9.67600E-02 | 1.82702E-02 | |
| S2 | 0.00000 | 5.16614E-02 | -8.66746E-03 | -1.02776E-01 | 1.82007E-01 | -2.79494E-01 | 2.98195E-01 | -1.67416E-01 | 3.80380E-02 | |
| S3 | 0.00000 | 5.71161E-02 | -1.31916E-02 | 2.13866E-02 | -1.53631E+00 | 4.29084E+00 | -6.93187E+00 | 6.92404E+00 | -3.88552E+00 | 9.31726E-01 |
| S4 | 1.84436 | 3.78245E-03 | 2.90316E-01 | -1.60385E-01 | 7.03652E+00 | -2.22940E+01 | 4.46029E+01 | -5.35574E+01 | 3.56211E+01 | -1.01734E+01 |
| S5 | 0.00000 | 3.11186E-02 | 4.75606E-02 | -2.32024E+00 | 5.00377E+00 | -4.17962E+00 | -1.18911E+00 | 3.98189E+00 | -4.61926E+01 | 1.98821E+01 |
| S6 | 0.00000 | -7.35627E-02 | 8.67300E-01 | -3.96619E+00 | 1.09620E+01 | -2.32728E+01 | 3.47936E+01 | -3.40505E+01 | 2.02345E+01 | -5.54907E+00 |
| S8 | 0.00000 | -1.63880E-01 | -1.14874E-01 | 6.58330E-01 | -5.25190E+00 | 2.29269E+01 | -6.11083E+01 | 9.88314E+01 | -8.91045E+01 | 3.43709E+01 |
| S9 | 0.00000 | -6.47342E-03 | -1.76318E-02 | 1.31173E-02 | -5.56936E+00 | 1.29588E+01 | -1.65691E+01 | 1.13316E+01 | -3.64918E+00 | 5.00569E-01 |
| S10 | 0.00000 | 1.89177E-02 | -2.86506E-01 | 4.50051E-01 | -3.14472E-01 | 9.63385E-02 | 1.57230E-01 | -1.23797E-01 | 4.18715E-02 | -5.45243E-03 |
| S11 | 0.00000 | 5.83821E-03 | -2.03300E-01 | 3.29182E-01 | -3.51227E-01 | 2.58113E-01 | -1.28382E-01 | 4.09371E-02 | -7.53904E-03 | 6.08384E-04 |
| S12 | 80.60842 | -1.13131E-01 | 1.61850E-01 | -1.89662E-01 | 1.37669E-01 | -6.62558E-02 | 2.17788E-02 | -4.70547E-03 | 5.95287E-04 | -3.29484E-05 |
| S13 | 0.00000 | 1.35187E-01 | 1.24005E-01 | -9.08644E-01 | 4.59669E-02 | 1.64517E-02 | 3.96067E-03 | -5.60362E-04 | 3.60743E-05 | -3.49305E-07 |

OPTICAL IMAGING SYSTEM

CROSS-REFERENCE TO RELATED APPLICATIONS

This application is a continuation of application Ser. No. 17/307,186 filed on May 4, 2021, now U.S. Pat. No. 11,796,762 issued on Oct. 24, 2023, which is a continuation of application Ser. No. 16/377,343 filed on Apr. 8, 2019, now U.S. Pat. No. 11,029,490 issued on Jun. 8, 2021, which is a division of application Ser. No. 15/468,312 filed on Mar. 24, 2017, now U.S. Pat. No. 10,302,911 issued on May 28, 2019, and claims the benefit under 35 USC 119 (a) of Korean Patent Application Nos. 10-2016-0117275 filed on Sep. 12, 2016, and 10-2016-0136720 filed on Oct. 20, 2016, in the Korean Intellectual Property Office. The entire disclosures of application Ser. Nos. 17/307,186, 16/377,343, and 15/468,312 and Korean Patent Application Nos. 10-2016-0117275 and 10-2016-0136720 are incorporated herein by reference for all purposes.

BACKGROUND

1. Field

The following description relates to a telephoto imaging system including six lenses.

2. Description of Related Art

A telephoto imaging system for imaging a distant object may have a substantial size. For example, in a telephoto imaging system, a ratio (TL/f) of an overall imaging system length (TL) with respect to an overall focal length (f) may be 1 or more. In this case, there are limitations in mounting a telephoto imaging system in a small electronic device such as a mobile terminal, or the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various examples describe provide an optical imaging system for imaging a distant object, while being mounted in a small terminal.

In accordance with an embodiment, an optical imaging system includes lenses sequentially disposed from an object side of the optical imaging system toward an imaging plane of the optical imaging system; and a stop disposed between a third lens of the lenses and a fourth lens of the lenses, wherein an object-side surface of the third lens is concave, and a ratio TL/f of a distance TL from an object-side surface of a first lens of the lenses to the imaging plane with respect to an overall focal length f of the optical imaging system is greater than 0.7 and less than 1.0.

The first lens may have a positive refractive power, and an object-side surface of the first lens may be convex.

A second lens of the lenses may have a negative refractive power, an object-side surface of the second lens may be convex, and an image-side surface of the second lens may be concave.

The third lens may have a negative refractive power, and an object-side surface of the third lens may be convex.

An object-side surface of the fourth lens may be convex.

In accordance with an embodiment, an optical imaging system includes a first lens; a second lens; a third lens; a fourth lens; and a fifth lens, wherein the first lens to the fifth lens each have a refractive power; a sixth lens having a convex object-side surface; and a stop disposed between the third lens and the fourth lens.

The optical imaging system may satisfy a Conditional Expression $0.7<TL/f<1.0$, where TL is a distance from an object-side surface of the first lens to an imaging plane, and f is an overall focal length of the optical imaging system.

The optical imaging system may satisfy a Conditional Expression $0.15<R1/f<0.32$, where R1 is a radius of curvature of an object-side surface of the first lens, and f is an overall focal length of the optical imaging system.

The optical imaging system may satisfy a Conditional Expression $-3.5<f/f2<-0.5$, where f is an overall focal length of the optical imaging system, and f2 is a focal length of the second lens.

The optical imaging system may satisfy a Conditional Expression $0.1<d45/TL<0.32$, where d45 is a distance from an image-side surface of the fourth lens to an object-side surface of the fifth lens, and TL is a distance from an object-side surface of the first lens to an imaging plane.

The optical imaging system may satisfy a Conditional Expression $1.6<Nd6<1.75$, where Nd6 is a refractive index of the sixth lens.

The optical imaging system may satisfy a Conditional Expression $0.3<\tan\theta<0.5$, where θ is a half angle or field of view of the optical imaging system.

The optical imaging system may satisfy a Conditional Expression $2.0<f/EPD<2.7$, where f is an overall focal length of the optical imaging system, and EPD is a diameter of an entrance pupil of the optical imaging system.

The refractive power of the first lens and a refractive power of the sixth lens may have a same sign.

The refractive power of the second lens and the refractive power of the fifth lens may have a same sign that is different from a sign of the refractive power of the first lens.

An object-side surface of the sixth lens may be convex.

In accordance with an embodiment, an optical imaging system includes a first lens; a second lens having a convex object-side surface; a third lens having a concave image-side surface; a fourth lens having a convex object-side surface; a fifth lens having a concave object-side surface; and a sixth lens, wherein the first lens has a most convex object-side surface among the first to sixth lenses, and the first lens and the fifth lens have a refractive index less than 1.6, and the second lens, the third lens, the fourth lens, and the sixth lens have a refractive index equal to or greater than 1.6.

The second lens may have a most concave image-side surface among the first to sixth lenses.

The first lens may have a positive refractive power, the second lens may have a negative refractive power, the third lens may have a negative refractive power, the fourth lens may have a positive refractive power or a negative refractive power, the fifth lens may have a negative refractive power, and the sixth lens may have a positive refractive power.

The first lens may have a highest refractive power among the first to sixth lenses, and the sixth lens may have a lowest refractive power among the first to sixth lenses.

Other features and aspects will be apparent from the following detailed description, the drawings, and the claims.

BRIEF DESCRIPTION OF DRAWINGS

FIG. 3 is a table listing aspherical characteristics of the lenses of the optical imaging system illustrated in FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In accordance with an example, a first lens refers to a lens closest to an object or a subject of which an image is captured. A sixth lens is a lens closest to an imaging plane or an image sensor. In the present specification, all radii of curvature of lenses, thicknesses of the lenses and other elements, gaps between the lenses and other elements, an overall length of the optical imaging system, i.e., a distance from an object-side surface of the first lens to the imaging plane (TL), a half diagonal length of the imaging plane (IMG HT), focal lengths of the lenses, and an overall focal length of the optical imaging system (f) are indicated in millimeters (mm). However, other units of measurement may be used. Further, the thicknesses of the lenses and other elements, the gaps between the lenses and other elements, and TL are measured along an optical axis of the optical imaging system.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

In addition, in an embodiment, thicknesses and radii of curvatures of lenses are measured in relation to optical axes of the corresponding lenses.

An optical imaging system includes six lenses. For example, the optical imaging system may include a first lens, a second lens, a third lens, a fourth lens, a fifth lens, and a sixth lens sequentially disposed from an object side to an image side. In another example, the optical imaging system may include from four lenses up to six lenses without departing from the scope of the embodiments herein described. Although embodiments of the optical imaging system described herein include six lenses with a refractive power, a person of ordinary skill in the relevant art will appreciate that the number of lenses in the optical imaging system may vary, for example, between two to six lenses, while achieving the various results and benefits described hereinbelow. Also, although each lens is described as having a particular refractive power, a different refractive power for at least one of the lenses may be used to achieve the intended result.

The first lens has a refractive power. For example, the first lens has a positive refractive power. At least one surface of the first lens is convex. For example, an object-side surface of the first lens is convex.

The first lens has an aspherical surface. For example, both surfaces of the first lens are aspherical. The first lens is formed of a material having a high degree of light transmissivity and excellent workability. For example, the first lens may be formed of a plastic material or a polyurethane material. However, a material of the first lens is not limited to being a plastic material. For example, the first lens may be formed of a glass material. The first lens has a low refractive index. For example, the refractive index of the first lens is lower than 1.6.

The second lens has a refractive power. For example, the second lens has a negative refractive power. One surface of the second lens is convex. For example, an object-side surface of the second lens is convex.

The second lens has an aspherical surface. For example, an object-side surface of the second lens is aspherical. The second lens is formed of a material having a high degree of light transmissivity and excellent workability. For example, the second lens is formed of a plastic material or a polyurethane material. However, a material of the second lens is not limited to being plastic. For example, the second lens may be formed of a glass material. The second lens has a refractive index higher than that of the first lens. For example, the refractive index of the second lens is 1.6 or more.

The third lens has a refractive power. For example, the third lens has a negative refractive power. At least one surface of the third lens is concave. For example, an object-side surface of the third lens is concave.

The third lens has an aspherical surface. For example, an image-side surface of the third lens is aspherical. The third lens is formed of a material having a high degree of light transmissivity and excellent workability. For example, the third lens may be formed of a plastic material or a polyurethane material. However, a material of the third lens is not limited to being plastic. For example, the third lens may be formed of a glass material. The third lens has a refractive index higher than that of the first lens. For example, a refractive index of the third lens is 1.6 or more.

The fourth lens has a refractive power. For example, the fourth lens has a positive refractive power or a negative refractive power. At least one surface of the fourth lens is convex. For example, an object-side surface of the fourth lens is convex.

The fourth lens has an aspherical surface. For example, both surfaces of the fourth lens are aspherical. The fourth lens is formed of a material having a high degree of light transmissivity and excellent workability. For example, the fourth lens may be formed of a plastic material or a polyurethane material. However, a material of the fourth lens is not limited to being plastic. For example, the fourth lens may be formed of a glass material. The fourth lens has a refractive index higher than that of the first lens. For example, a refractive index of the fourth lens is 1.6 or more.

The fifth lens has a refractive power. For example, the fifth lens has a negative refractive power. At least one surface of the fifth lens is concave. For example, both surfaces of the fifth lens are concave.

The fifth lens has an aspherical surface. For example, both surfaces of the fifth lens are aspherical. The fifth lens is formed of a material having a high degree of light transmissivity and excellent workability. For example, the fifth lens may be formed of a plastic material or a polyurethane material. However, a material of the fifth lens is not limited to being plastic. For example, the fifth lens may be formed of a glass material. The fifth lens has a refractive index substantially the same as that of the first lens. For example, a refractive index of the fifth lens is less than 1.6.

The sixth lens has a refractive power. For example, the sixth lens has a positive refractive power. At least one surface of the sixth lens is convex. For example, an image-side surface of the sixth lens is convex. The sixth lens has an inflection point. For example, the sixth lens has one or more inflection points formed on both surfaces thereof.

The sixth lens has an aspherical surface. For example, both surfaces of the sixth lens may be aspherical. The sixth lens is formed of a material having a high degree of light transmissivity and excellent workability. For example, the sixth lens may be formed of a plastic material or a polyurethane material. However, a material of the sixth lens is not limited to being plastic. For example, the sixth lens may be formed of a glass material. The sixth lens has a refractive index higher than that of the first lens. For example, a refractive index of the sixth lens may be 1.6 or more.

In accordance with other embodiments, each or at least one of the first through sixth lenses may be configured in an opposite refractive power from the configuration described above. For example, in an alternative configuration, the first lens has a negative refractive power, the second lens has a positive refractive power, the third lens has a positive refractive power, the fourth lens has a negative refractive power, the fifth lens has a positive refractive power, and the sixth lens has a negative refractive power.

An aspherical surface of each of the first lens to the sixth lens may be represented by Equation 1 below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \tag{1}$$

In Equation 1, c is an inverse of a radius of curvature of the lens, k is a conic constant, r is a distance from a certain point on an aspherical surface of the lens to an optical axis, A to H and J are aspherical constants, and Z (or SAG) is a distance between the certain point on the aspherical surface of the lens at the distance r and a tangential plane meeting the apex of the aspherical surface of the lens.

An optical imaging system may further include a filter, an image sensor, and a stop.

The filter may be disposed between the sixth lens and the image sensor. The filter blocks some wavelengths of light to obtain a clear image. For example, the filter may block an infrared wavelength of light. The filter has a predetermined refractive index. For example, the filter may have a refractive index of 1.53 or less. In addition, the filter has a predetermined Abbe number. For example, the filter may have an Abbe number of 40 or less.

The image sensor forms an imaging plane. For example, a surface of the image sensor may form an imaging plane.

The stop is disposed to adjust an amount of light incident on a lens. For example, the stop is disposed between the third lens and the fourth lens.

The optical imaging system satisfies the following Conditional Expressions:

$0.7 < TL/f < 1.0$     (Conditional Expression 1)

$0.15 < R1/f < 0.32$     (Conditional Expression 2)

$-3.5 < f/f2 < -0.5$     (Conditional Expression 3)

$0.1 < d45/TL < 0.7$     (Conditional Expression 4)

$1.6 < Nd6 < 1.75$     (Conditional Expression 5)

$0.3 < \tan \theta < 0.5$     (Conditional Expression 6)

$2.0 < f/EPD < 2.7$     (Conditional Expression 7)

In the Conditional Expressions, TL is a distance from an object-side surface of the first lens to an imaging plane, f is an overall focal length of the optical imaging system, and f2 is a focal length of the second lens. Furthermore, R1 is a radius of curvature of the object-side surface of the first lens, d45 is a distance from an image-side surface of the fourth lens to an object-side surface of the fifth lens, Nd6 is a refractive index of the sixth lens, θ is a half angle or field of view (HFOV) of the optical imaging system, and EPD is a diameter of an entrance pupil of the optical imaging system.

Conditional Expression 1 specifies a condition for miniaturization of the optical imaging system. For example, in a case in which an optical imaging system is outside of an upper limit value of Conditional Expression 1, there may be limitations on the miniaturization thereof, thus, making it difficult to mount such an optical imaging system in a portable terminal. In addition, in a case in which an optical imaging system is outside of a lower limit value of Conditional Expression 1, there may be limitations in the manufacturing of the optical imaging system.

Conditional Expression 2 specifies a condition for manufacturing a first lens to configure a telephoto imaging system. For example, in a case in which a first lens is outside of an upper limit value of Conditional Expression 2, a longitudinal spherical aberration is increased and a focal length of the optical imaging system is short. In a case in which a first lens is outside of a lower limit value of Conditional Expression 2, a focal length of the optical imaging system is increased, but there may be limitations on the manufacturing thereof. In addition, in a case in which a first lens is outside of a lower limit value of Conditional Expression 2, a thickness of an edge portion of a lens may be thinner, thus, producing limitations on the manufacturing thereof.

Conditional Expression 3 specifies a design condition of the second lens for implementing an optical imaging system having a high degree of resolution. For example, in a case in which a second lens is outside of the numerical range of Conditional Expression 3, astigmatic aberration of the optical imaging system is increased to cause degradation of an image.

Conditional Expression 4 specifies a design condition for configuring a telephoto imaging system. For example, in a case in which an optical imaging system is outside of a lower limit value of Conditional Expression 4, since a focal length is short, there are limitations in using such an optical imaging system for telephoto purposes. In a case in which an optical imaging system is outside of an upper limit value of Conditional Expression 4, because an overall length TL of the optical imaging system is increased, there may be limitations on the miniaturization thereof.

Conditional Expression 5 specifies a design condition of a fifth lens for an optical imaging system having a high degree of resolution. For example, in a case in which a fifth lens satisfying the numerical range of Conditional Expression 5 has a low Abbe number of 25 or less, there is an advantage in correcting astigmatic aberrations, longitudinal chromatic aberrations, and magnification aberrations.

Conditional Expression 6 specifies a range of a half angle or field of view (HFOV) for configuring a telephoto imaging system, while Conditional Expression 7 specifies the numerical range of an f-number for an optical imaging system having a high degree of resolution.

In an optical imaging system, lenses may be disposed in a predetermined order depending on refractive power thereof (an absolute value of an inverse number of a focal length). As an example, refractive power of an odd-numbered lens is greater than that of refractive power of an even-numbered lens disposed on an image-side surface. In other words, refractive power of the first lens is greater than refractive power of the second lens, refractive power of the third lens is greater than refractive power of the fourth lens, and refractive power of the fifth lens is greater than refractive power of the sixth lens.

In the optical imaging system, a lens having the highest refractive power is a lens closest to an object, and a lens having the lowest refractive power is a lens closest to an imaging plane or an image sensor. For example, in the optical imaging system, the first lens has the highest refractive power, and the fourth lens or the sixth lens has the lowest refractive power.

In the optical imaging system, in accordance with an embodiment, the first lens has the most convex surface or the most convex contour of any of the lenses. For example, an object-side surface of the first lens has the most convex surface of all of the lenses. In other words, the first lens has a shortest or smallest radius of curvature from the optical axis of all the lenses included in the optical imaging system, thus, having a largest convex object-side surface in the optical imaging system.

In the optical imaging system, the second lens has the most concave surface or the most concave contour of any of the lenses. For example, an image-side surface of the second lens has the most concave surface of all of the lenses. In other words, the second lens has a greatest radius of curvature from the optical axis of all the lenses included in the optical imaging system, thus, having a largest concave image-side surface in the optical imaging system.

In the optical imaging system, the fourth lens has a substantially flat surface. For example, an image-side surface of the fourth lens has a shape close to planar. In the optical imaging system, three or more neighboring lenses have refractive indices substantially similar to each other. For example, the second lens to the fourth lens has substantially the same or similar refractive indices. The refractive indices of the second lens to the fourth lens may be selected within the range of 1.63 to 1.68.

Focal lengths of lenses forming the optical imaging system may be selected within a predetermined range. For example, a focal length of the first lens is selected within the range of 2.4 mm to 3.1 mm, a focal length of the second lens is selected within the range of −8.5 mm to −5.8 mm, a focal length of the third lens is selected within the range of −11.5 mm to −3.8 mm, a focal length of the fifth lens is selected within the range of −4.7 mm to −3.7 mm, and a focal length of the sixth lens is selected within the range of 9.0 mm to 13.5 mm.

Next, optical imaging systems according to several examples will be described.

Figure 1:
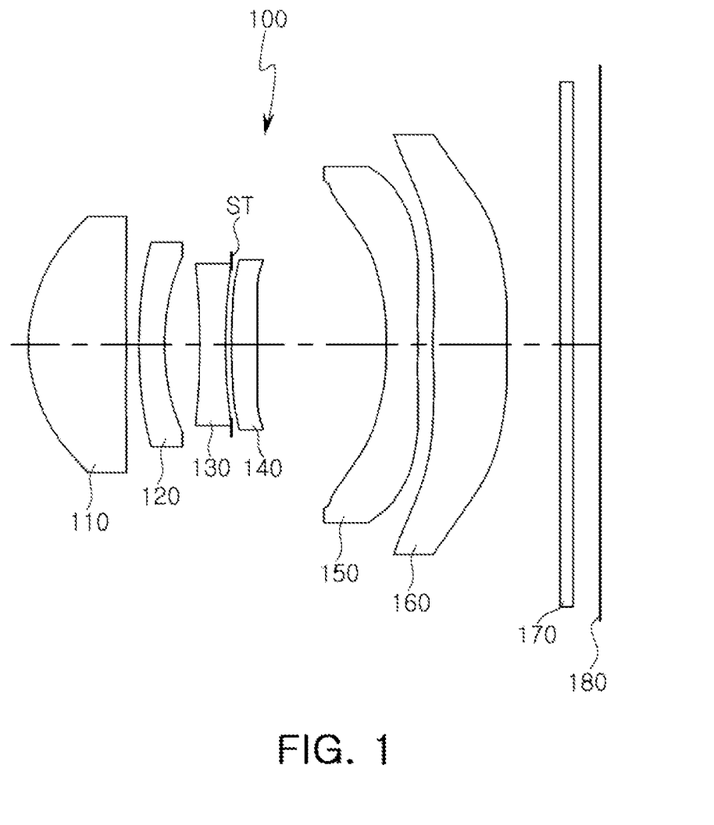
FIG. 1 is a view of an optical imaging system according to a first example.

FIG. 1 is a view of an optical imaging system according to a first example.

An optical imaging system 100 includes a first lens 110, a second lens 120, a third lens 130, a fourth lens 140, a fifth lens 150, and a sixth lens 160.

The first lens 110 has a positive refractive power, and both surfaces thereof are convex. The second lens 120 has a negative refractive power, an object-side surface thereof is convex, and an image-side surface thereof is concave. The third lens 130 has a negative refractive power, and both surfaces thereof are concave. The fourth lens 140 has a positive refractive power, and both surfaces thereof are convex. The fifth lens 150 has a negative refractive power, and both surfaces thereof are concave. In addition, the fifth lens 150 has an inflection point formed on both surfaces. The sixth lens 160 has a positive refractive power, and both surfaces thereof are convex. In addition, the sixth lens 160 has an inflection point formed on an object-side surface or an image-side surface.

The first lens 110, among the lenses, has the highest refractive power, while the sixth lens 160 has the lowest refractive power.

The optical imaging system 100 may further include a filter 170, an image sensor 180, and a stop ST. The filter 170 is disposed between the sixth lens 160 and the image sensor 180, and the stop ST is disposed between the third lens 130 and the fourth lens 140.

Figure 2:
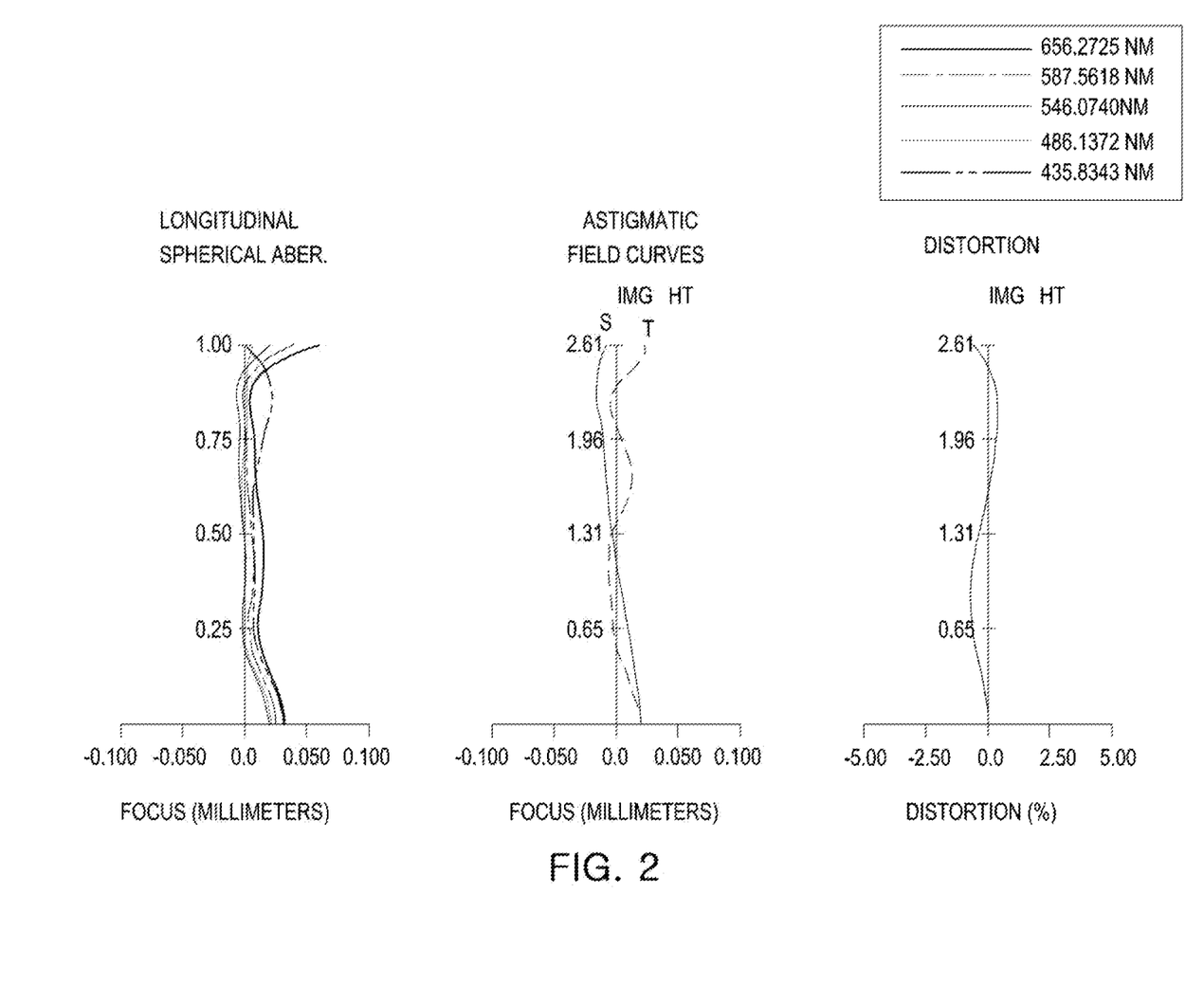
FIG. 2 illustrates aberration curves of the optical imaging system illustrated in FIG. 1.

FIG. 2 illustrates aberration curves of the optical imaging system 100 illustrated in FIG. 1, and FIG. 3 is a table listing aspherical characteristics of the lenses of the optical imaging system 100 illustrated in FIG. 1.

Table 1 below lists characteristics of the optical imaging system 100 illustrated in FIG. 1.

TABLE 1

First Example
HFOV = 23.797 f = 5.997 TL = 5.391

| Surface # | Element | Radius of Curvature | Thickness/ Distance | Focal Length | Refractive Index | Abbe # |
|---|---|---|---|---|---|---|
| S1 | 1st lens | 1.5100 | 0.9130 | 2.750 | 1.544 | 56.1 |
| S2 | | −323.8700 | 0.1300 | | | |
| S3 | 2nd lens | 6.2200 | 0.2400 | −6.460 | 1.661 | 20.3 |
| S4 | | 2.5100 | 0.3320 | | | |
| S5 | 3rd lens | −7.1600 | 0.2400 | −4.260 | 1.650 | 21.5 |
| S6 | | 4.6600 | 0.0500 | | | |
| S7 | Stop | infinity | 0.0100 | | | |
| S8 | 4th lens | 4.6400 | 0.2400 | 6.900 | 1.650 | 21.5 |
| S9 | | −200.0000 | 1.2210 | | | |
| S10 | 5th lens | −2.7300 | 0.2900 | −4.230 | 1.544 | 56.1 |
| S11 | | 15.7300 | 0.1500 | | | |
| S12 | 6th lens | 17.1800 | 0.6980 | 10.310 | 1.650 | 21.5 |
| S13 | | −11.0100 | 0.5000 | | | |
| S14 | Filter | infinity | 0.1100 | | 1.523 | 39.1 |

TABLE 1-continued

First Example
HFOV = 23.797 f = 5.997 TL = 5.391

| Surface # | Element | Radius of Curvature | Thickness/ Distance | Focal Length | Refractive Index | Abbe # |
|---|---|---|---|---|---|---|
| S15 | | infinity | 0.2670 | | | |
| S16 | Imaging plane | infinity | | | | |

Figure 4:
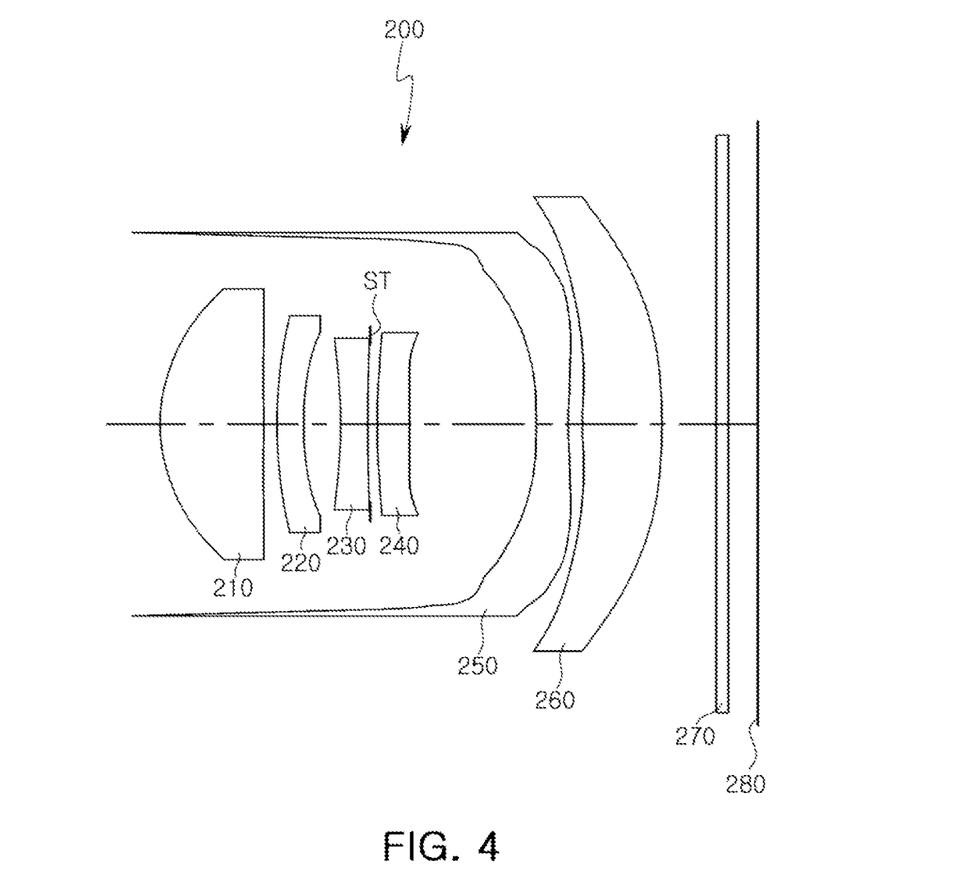
FIG. 4 is a view of an optical imaging system according to a second example.

FIG. 4 is a view of an optical imaging system according to a second example.

An optical imaging system 200 includes a first lens 210, a second lens 220, a third lens 230, a fourth lens 240, a fifth lens 250, and a sixth lens 260.

The first lens 210 has a positive refractive power, and both surfaces thereof are convex. The second lens 220 has a negative refractive power, an object-side surface thereof is convex, and an image-side surface thereof is concave. The third lens 230 has a negative refractive power, and both surfaces thereof are concave. The fourth lens 240 has a positive refractive power, and both surfaces thereof are convex. The fifth lens 250 has a negative refractive power, and both surfaces thereof are concave. In addition, the fifth lens 250 has an inflection point formed on both surfaces. The sixth lens 260 has a positive refractive power, and both surfaces thereof are convex. In addition, the sixth lens 260 has an inflection point formed on at least one surface.

In one configuration and as illustrated in FIG. 4, endpoints of the fifth lens 250 extend, along an optical axis, toward the object side surface, covering (at end portions of the first through fourth lenses 210 through 240, where the end portions are positioned perpendicular to the optical axis) the first lens 210, the second lens 220, the third lens 230, and the fourth lens 240. Although the fifth lens 250 is illustrated as extending the endpoints thereof, at ends after inflection points, which are positioned at end portions of the object-side surface of the fifth lens 250, the fifth lens 250 may extend to only cover some of the second through fourth lenses 210 through 240. Also, the endpoints of the fifth lens 250 extend towards the object-side, covering end portions of the lenses 210 through 240, with or without contacting the end portions of the lenses 210 through 240.

The first lens 210, among the lenses, has the highest refractive power, and the sixth lens 260 has the lowest refractive power.

The optical imaging system 200 includes a filter 270, an image sensor 280, and a stop ST. The filter 270 is disposed between the sixth lens 260 and the image sensor 280, and the stop ST is disposed between the third lens 230 and the fourth lens 240.

Figure 5:
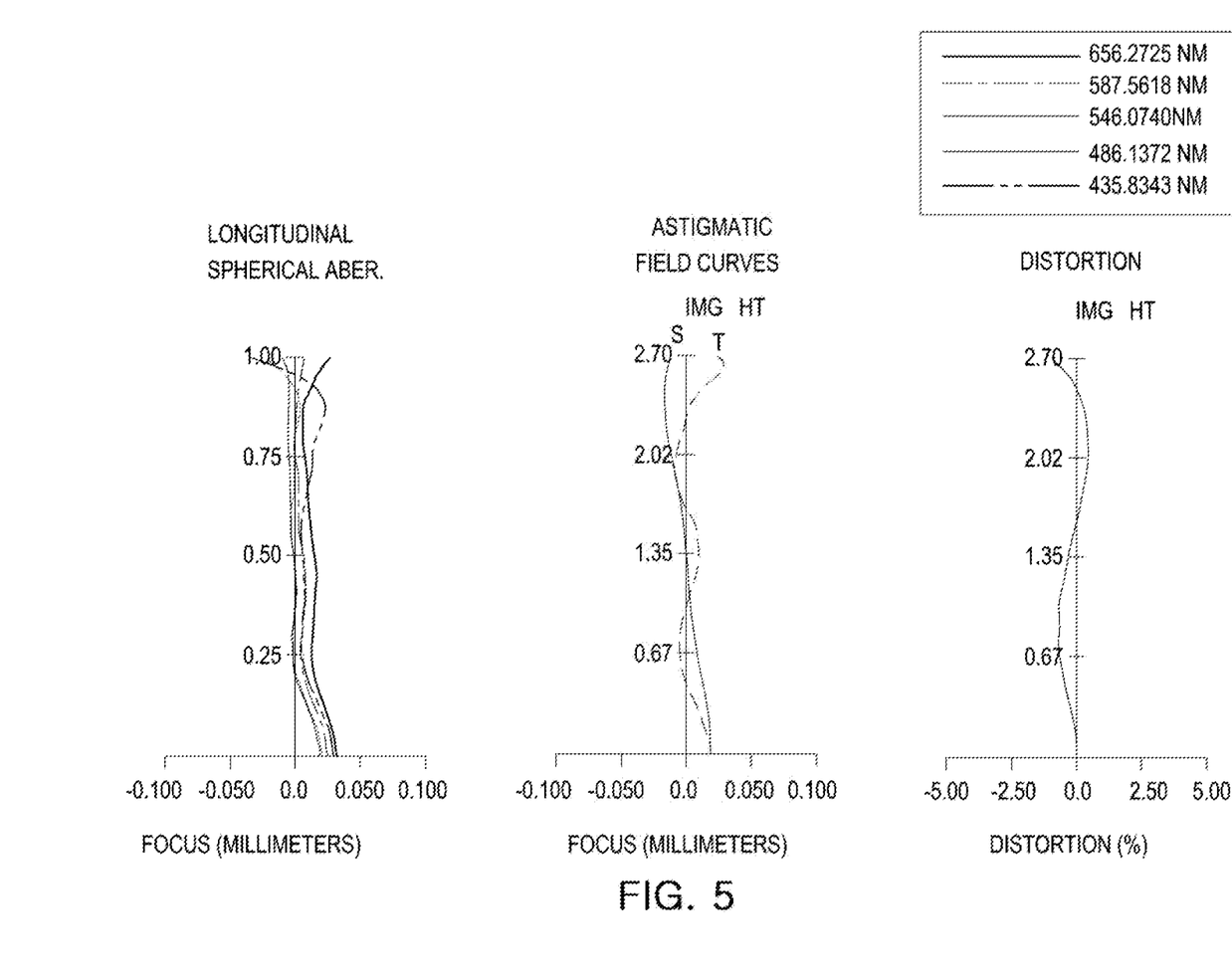
FIG. 5 illustrates aberration curves of the optical imaging system illustrated in FIG. 4.
Figure 6:
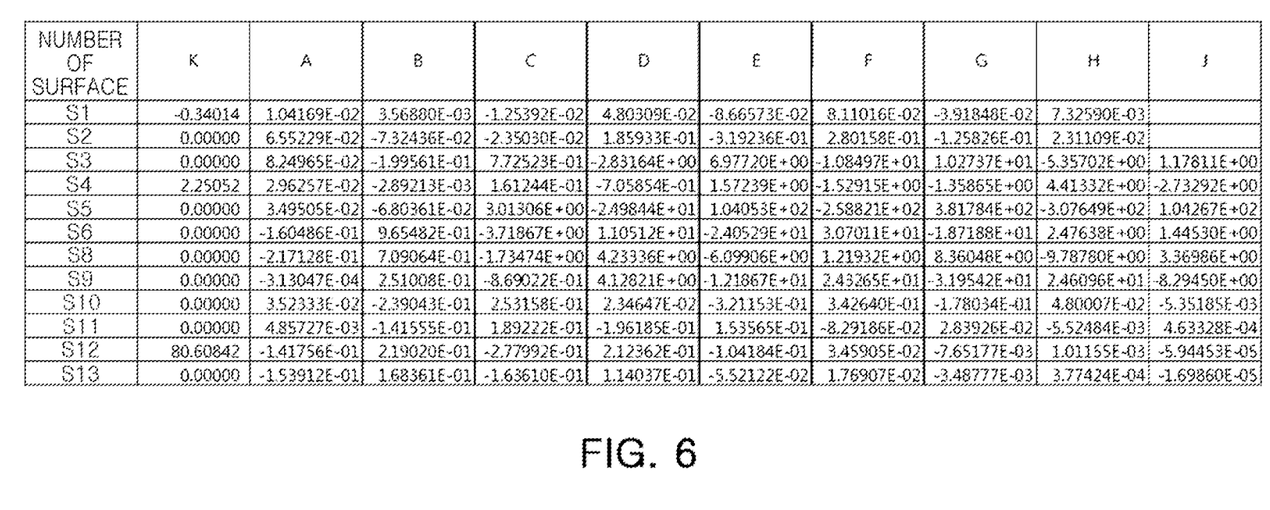
FIG. 6 is a table listing aspherical characteristics of the lenses of the optical imaging system illustrated in FIG. 4.

FIG. 5 illustrates aberration curves of the optical imaging system 200 illustrated in FIG. 4, and FIG. 6 is a table listing aspherical characteristics of the lenses of the optical imaging system 200 illustrated in FIG. 4.

Table 2 below lists characteristics of the optical imaging system 200 illustrated in FIG. 4.

TABLE 2

Second Example
HFOV = 23.797 f = 6.001 TL = 5.655

| Surface # | Element | Radius of Curvature | Thickness/ Distance | Focal Length | Refractive Index | Abbe # |
|---|---|---|---|---|---|---|
| S1 | 1st lens | 1.5100 | 0.9090 | 2.760 | 1.544 | 56.1 |

TABLE 2-continued

Second Example
HFOV = 23.797 f = 6.001 TL = 5.655

| Surface # | Element | Radius of Curvature | Thickness/ Distance | Focal Length | Refractive Index | Abbe # |
|---|---|---|---|---|---|---|
| S2 | | −4974.2600 | 0.1210 | | | |
| S3 | 2nd lens | 6.6100 | 0.2400 | −6.960 | 1.661 | 20.3 |
| S4 | | 2.6900 | 0.3430 | | | |
| S5 | 3rd lens | −5.1000 | 0.2400 | −5.300 | 1.650 | 21.5 |
| S6 | | 11.2400 | 0.0180 | | | |
| S7 | Stop | infinity | 0.0700 | | | |
| S8 | 4th lens | 6.9800 | 0.2400 | 10.590 | 1.650 | 21.5 |
| S9 | | −2000.0000 | 1.2040 | | | |
| S10 | 5th lens | −2.9900 | 0.2900 | −4.230 | 1.544 | 56.1 |
| S11 | | 10.6000 | 0.1290 | | | |
| S12 | 6th lens | 17.5600 | 0.7090 | 11.500 | 1.650 | 21.5 |
| S13 | | −13.0700 | 0.5000 | | | |
| S14 | Filter | infinity | 0.1100 | | 1.523 | 39.1 |
| S15 | | infinity | 0.2660 | | | |
| S16 | Imaging plane | infinity | 0.2660 | | | |

Figure 7:
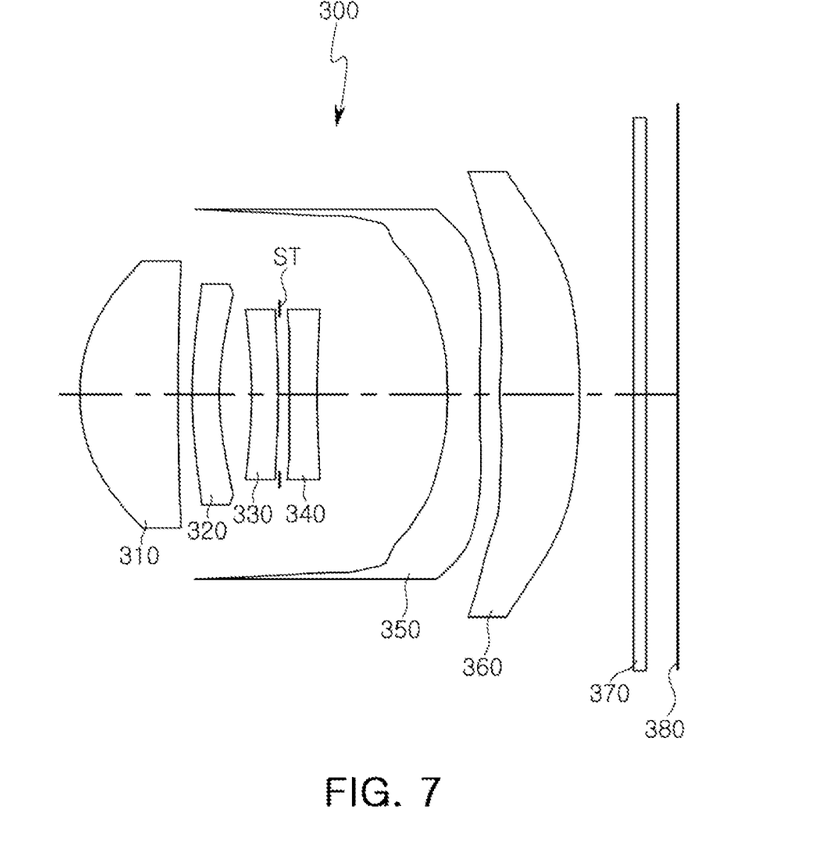
FIG. 7 is a view of an optical imaging system according to a third example.

FIG. 7 is a view of an optical imaging system according to a third example.

An optical imaging system 300 includes a first lens 310, a second lens 320, a third lens 330, a fourth lens 340, a fifth lens 350, and a sixth lens 360.

In the third example, the first lens 310 has a positive refractive power, an object-side surface thereof is convex, and an image-side surface thereof is concave. The second lens 320 has a negative refractive power, an object-side surface thereof is convex, and an image-side surface thereof is concave. The third lens 330 has a negative refractive power, an object-side surface thereof is concave, and an image-side surface thereof is convex. The fourth lens 340 has a negative refractive power, an object-side surface thereof is convex, and an image-side surface thereof is concave. The fifth lens 350 has a negative refractive power, and both surfaces thereof are concave. In addition, the fifth lens 350 has an inflection point formed on both surfaces. The sixth lens 360 has a positive refractive power, and both surfaces thereof are convex. In addition, the sixth lens 360 has an inflection point formed on at least one surface.

In one configuration and as illustrated in FIG. 7, endpoints of the fifth lens 250 extend, along an optical axis, toward the object side surface, covering (at end portions of the second through fourth lenses 320 through 340, where the end portions are positioned perpendicular to the optical axis) the second lens 320, the third lens 330, and the fourth lens 340. Also, the endpoints of the fifth lens 350 extend towards the object-side, covering end portions of the lenses 320 through 340, with or without contacting the end portions of the lenses 320 through 340.

The optical imaging system 300 includes a filter 370, an image sensor 380, and a stop ST. The filter 370 is disposed between the sixth lens 360 and the image sensor 380, and the stop ST is disposed between the third lens 330 and the fourth lens 340.

The first lens 310 of the lenses has the highest refractive power, and the fourth lens 340 has the lowest refractive power.

Figure 8:
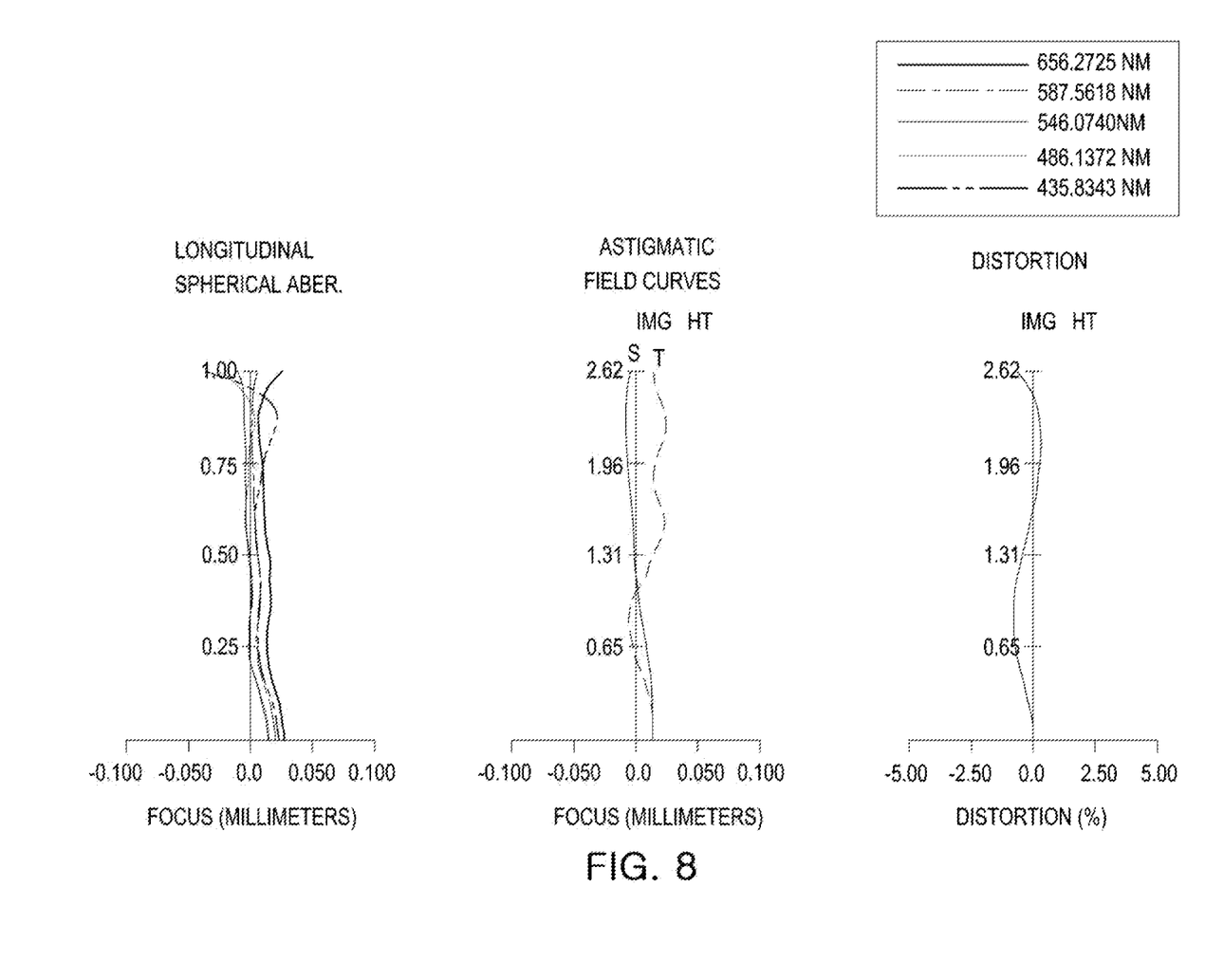
FIG. 8 illustrates aberration curves of the optical imaging system illustrated in FIG. 7.
Figure 9:
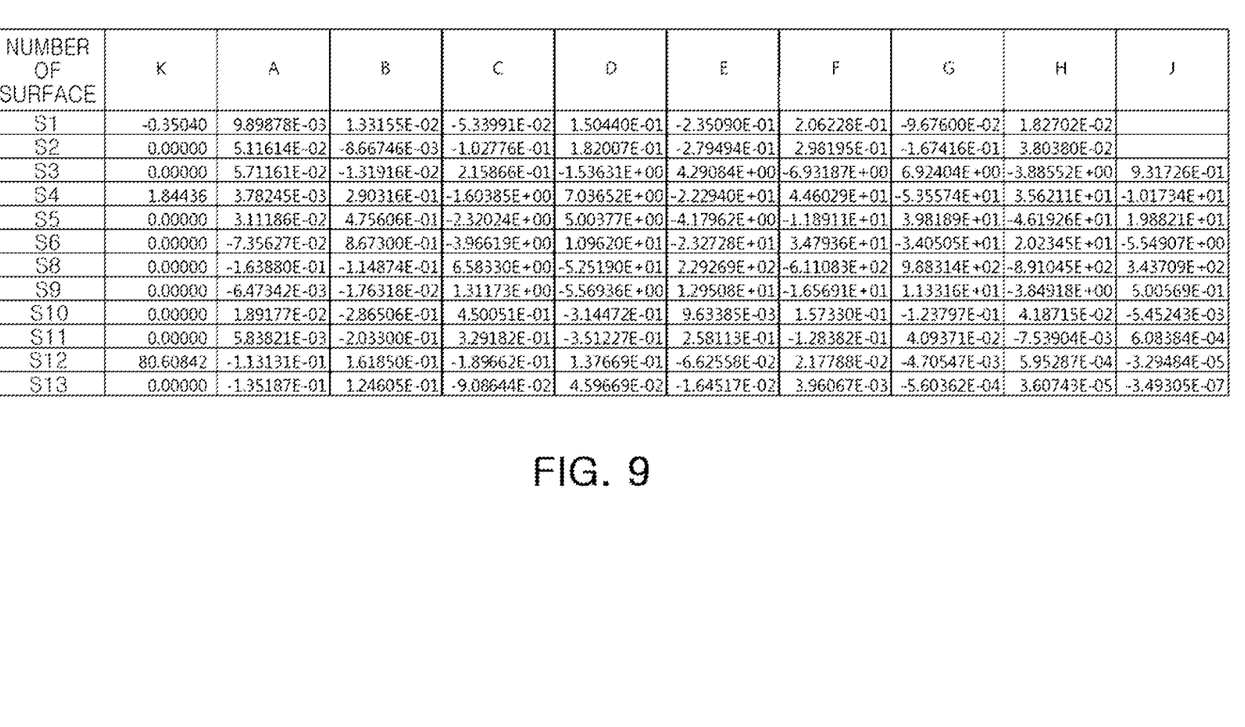
FIG. 9 is a table listing aspherical characteristics of the lenses of the optical imaging system illustrated in FIG. 7.

FIG. 8 illustrates aberration curves of the optical imaging system 300 illustrated in FIG. 7, and FIG. 9 is a table listing aspherical characteristics of the optical imaging system 300 illustrated in FIG. 7.

Table 3 below lists characteristics of the optical imaging system 300 illustrated in FIG. 7.

TABLE 3

Third Example
HFOV = 23.797 f = 6.001 TL = 5.395

| Surface # | Element | Radius of Curvature | Thickness/ Distance | Focal Length | Refractive Index | Abbe # |
|---|---|---|---|---|---|---|
| S1 | 1st lens | 1.4900 | 0.8910 | 2.770 | 1.544 | 56.1 |
| S2 | | 65.7500 | 0.1210 | | | |
| S3 | 2nd lens | 13.0600 | 0.2400 | −7.690 | 1.661 | 20.3 |
| S4 | | 3.6600 | 0.3010 | | | |
| S5 | 3rd lens | −4.9600 | 0.2400 | −10.430 | 1.650 | 21.5 |
| S6 | | −18.2300 | 0.0070 | | | |
| S7 | Stop | infinity | 0.1000 | | | |
| S8 | 4th lens | 20000.0 | 0.2400 | −18899.980 | 1.650 | 21.5 |
| S9 | | 7663.75 | 1.1820 | | | |
| S10 | 5th lens | −3.1200 | 0.2900 | −4.250 | 1.544 | 56.1 |
| S11 | | 9.3600 | 0.1890 | | | |
| S12 | 6th lens | 18.6100 | 0.7130 | 12.030 | 1.650 | 21.5 |
| S13 | | −13.5400 | 0.5000 | | | |
| S14 | Filter | infinity | 0.1100 | | 1.523 | 39.1 |
| S15 | | infinity | 0.2710 | | | |
| S16 | Imaging plane | infinity | | | | |

Table 4 below lists values of Conditional Expressions 1 to 7 for the optical imaging systems according to the first to third examples.

TABLE 4

| Conditional Expression | First Example | Second Example | Third Example |
|---|---|---|---|
| TL/f | 0.899 | 0.898 | 0.899 |
| R1/f | 0.251 | 0.252 | 0.248 |
| f/f2 | −0.928 | −0.862 | −0.781 |
| d45/TL | 0.226 | 0.223 | 0.219 |
| Nd6 | 1.650 | 1.650 | 2.650 |
| tan θ | 0.441 | 0.441 | 0.441 |
| f/EPD | 2.480 | 2.488 | 2.590 |

Figure 10:
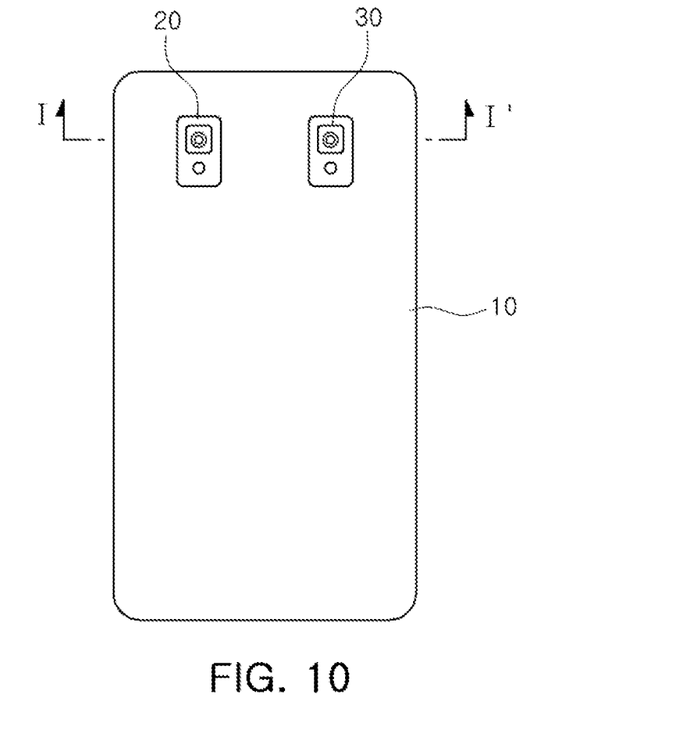
FIG. 10 is a rear view of a mobile terminal in which an optical imaging system according to an example is mounted.
Figure 11:
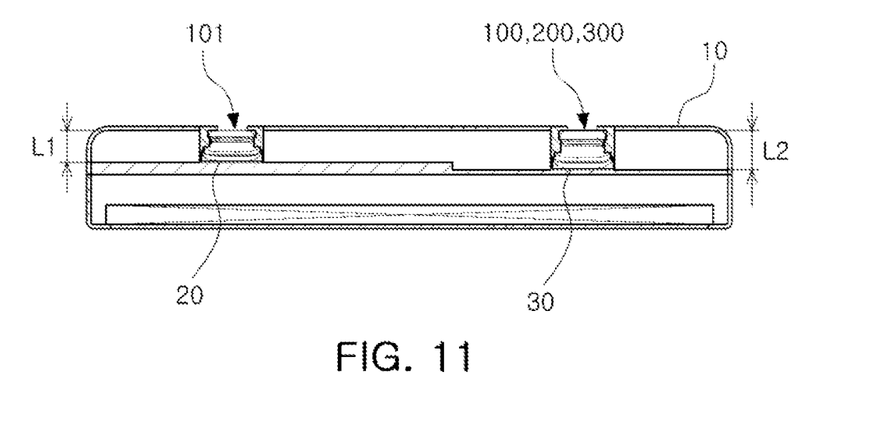
FIG. 11 is a cross-sectional view of the mobile terminal illustrated in FIG. 10.

FIG. 10 is a rear view of a mobile terminal in which an optical imaging system according to an example is mounted, and FIG. 11 is a cross-sectional view of the mobile terminal illustrated in FIG. 10.

A mobile terminal 10 includes a plurality of camera modules, a first camera module 20 and a second camera module 30. The first camera module 20 includes a first optical imaging system 101 configured to image a near subject, and the second camera module 30 includes a second optical imaging system 100, 200, or 300 configured to image a distant subject.

The first optical imaging system 101 includes a plurality of lenses. For example, the first optical imaging system 101 includes four or more lenses. The first optical imaging system 101 may be configured to integrally image objects located at a short distance. For example, the first optical imaging system 101 has a wide angle or field of view of 50 degrees or more, and a TL/f ratio is 1.0 or more.

The second optical imaging system 100, 200, or 300 includes a plurality of lenses. For example, the second optical imaging system 100, 200, or 300 includes six lenses. The second optical imaging system 100, 200, or 300 is one of the optical imaging systems, according to the first example to the third example, described previously. The second optical imaging system 100, 200, or 300 is configured to image an object located distantly. For example, the second optical imaging system 100, 200, or 300 has an angle or field of view of 40 degrees or less, and an L/f ratio is less than 1.0.

The first optical imaging system 101 and the second optical imaging system 100, 200, or 300 may have the substantially the same size. For example, an overall length L1 of the first optical imaging system 101 is substantially the same as an overall length L2 of the second optical imaging system 100, 200, or 300. Alternatively, a ratio L1/L2 of the overall length L1 of the first optical imaging system 101 with respect to the overall length L2 of the second optical imaging system 100, 200, or 300 is 0.8 to 1.0. Alternatively, a ratio L2/h of the overall length L2 of the second optical imaging system 100, 200, or 300 with respect to a thickness of the mobile terminal 10 is 0.8 or less.

As set forth above, according to examples, an optical imaging system for imaging a distant object while being mounted on a small terminal.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
 a first lens having a refractive power;
 a second lens having a refractive power;
 a third lens having a refractive power;
 a fourth lens having a refractive power;
 a fifth lens having a refractive power and a concave object-side surface in a paraxial region thereof; and
 a sixth lens having a refractive power,
 wherein the first to sixth lenses are sequentially disposed in ascending numerical order along an optical axis of the optical imaging system from an object side of the optical imaging system toward an imaging plane of the optical imaging system,
 the first to sixth lenses are the only lenses having a refractive power in the optical imaging system,
 a radius of curvature of an object-side surface of the fourth lens at the optical axis is greater than a radius of curvature of an object-side surface of the second lens at the optical axis and is also greater than a radius of curvature of an image-side surface of the second lens at the optical axis,
 a thickness of the third lens along the optical axis is greater than a distance along the optical axis from an image-side surface of the third lens to the object-side surface of the fourth lens, and
 a radius of curvature of an image-side surface of the fifth lens at the optical axis is greater than a radius of curvature of an object-side surface of the first lens at the optical axis.

2. The optical imaging system of claim 1, wherein the first lens has a concave image-side surface in a paraxial region thereof.

3. The optical imaging system of claim 1, wherein the object-side surface of the second lens is convex in a paraxial region thereof.

4. The optical imaging system of claim 1, wherein the image-side surface of the second lens is concave in a paraxial region thereof.

5. The optical imaging system of claim 1, wherein the image-side surface of the third lens is convex in a paraxial region thereof.

6. The optical imaging system of claim 1, wherein the object-side surface of the fourth lens is convex in a paraxial region thereof.

7. The optical imaging system of claim 1, wherein the fourth lens has a concave image-side surface in a paraxial region thereof.

8. The optical imaging system of claim 1, wherein the fifth lens has a concave image-side surface in a paraxial region thereof.

9. An optical imaging system comprising:
 a first lens having a concave image-side surface;
 a second lens having a refractive power;
 a third lens having a refractive power;
 a fourth lens having a refractive power;
 a fifth lens having a refractive power and a concave object-side surface in a paraxial region thereof; and
 a sixth lens having a refractive power,
 wherein the first to sixth lenses are sequentially disposed in ascending numerical order along an optical axis of the optical imaging system from an object side of the optical imaging system toward an imaging plane of the optical imaging system,
 the first to sixth lenses are the only lenses having a refractive power in the optical imaging system,
 a radius of curvature of an object-side surface of the fourth lens at the optical axis is greater than a radius of curvature of an image-side surface of the second lens at the optical axis,
 a thickness of the third lens along the optical axis is greater than a distance along the optical axis from an image-side surface of the third lens to the object-side surface of the fourth lens, and
 a radius of curvature of an image-side surface of the fifth lens at the optical axis is greater than a radius of curvature of an object-side surface of the first lens at the optical axis.

10. The optical imaging system of claim 9, wherein the second lens has a convex object-side surface in a paraxial region thereof.

11. The optical imaging system of claim 9, wherein the image-side surface of the second lens is concave in a paraxial region thereof.

12. The optical imaging system of claim 9, wherein the object-side surface of the fourth lens is convex in a paraxial region thereof.

13. The optical imaging system of claim 9, wherein the fourth lens has a concave image-side surface in a paraxial region thereof.

14. The optical imaging system of claim 9, wherein the sixth lens has a convex object-side surface in a paraxial region thereof.

* * * * *